Aug. 6, 1957 C. FUNKE 2,801,450

SEALING DEVICE

Filed May 25, 1953

INVENTOR

CARL FUNKE

BY Davis, Hoxie & Faithfull

ATTORNEYS

United States Patent Office 2,801,450
Patented Aug. 6, 1957

2,801,450
SEALING DEVICE
Carl Funke, Slottsbron, Sweden
Application May 25, 1953, Serial No. 357,174
12 Claims. (Cl. 20—69)

This invention relates to an improved sealing device of the type in which the seal is effected by a strip of elastic material between two bodies, for instance, between a window-arch and window-frame or between a door and door-case.

In sealing devices of this type as commonly made, the sealing strip has a fixing or securing part by which it is fixed to one of the two bodies (hereinafter called the "base") and also has a sealing part which engages or tightens against the other body (hereinafter called the "abutment"). The fixing part of the strip preferably expands in cross-section in a direction away from the sealing part, so that when the fixing part of such a strip is fitted into a notch with the same cross-section as that of the fixing part, the strip is secured in the notch against removal in any way other than by being pulled lengthwise. Such sealing devices are disclosed, for example, in United States Patents Nos. 1,363,354 and 2,132,060.

The notch which receives the strip in the base must generally be made with a profile cutter. As the strips are usually quite thin, the profile cutting tools must be small, with the result that the cutting capacity is small even if high-speed tools are used. Furthermore, a rough surface of the notch can hardly be avoided. It is seldom that the material is so homogeneous, and the guiding of the tool so absolutely perfect, that the irregularities in the hardness and structure of the material will have no adverse effect in the cutting of the notch. Thus, the notch will be either too large or too small in section, in addition to having a surface roughened by the cuts. If the notch is too large in section, the strip will not be secured adequately; and too small a section of the notch, together with the uneven surface, may cause difficulties in inserting the strip.

According to the present invention, which overcomes these disadvantages, the sealing device includes a bearing member in which the fixing part of the strip is inserted. This bearing member, usually in the form of a lath having a notch profile, is preferably made by drawing, extruding or similarly working the material from which it is made, so that metal alloys, plastics, or the like, can be used. A lath manufactured in this way can be made with a very exact cross-section and a smooth surface, even in the notch. The elastic strip is also preferably made by drawing, extrusion, rolling, or the like, whereby it will have exact dimensions and a very smooth surface. Thus, the strip can be made to fit precisely into the notch. Due to the smooth surfaces of the notch and the strip, the latter can easily be fitted into the notch or removed lengthwise; and due to the exact dimensions, the strip is safely secured in the notch against outward forces perpendicular to the notch. Leakage between the strip and the bearing member is eliminated.

The bearing member can be fixed to the base either by being fitted into a groove in the base or by being fastened to the surface of the base with nails, screws, or a suitable adhesive. The selection of the shape of the bearing member can be such as will permit the groove in the base to be cut with ordinary cylinder-cutters, having a large cutting capacity.

The invention will be better understood from the following description of some of its embodiments illustrated in the attached drawings, in which.

Figure 1:
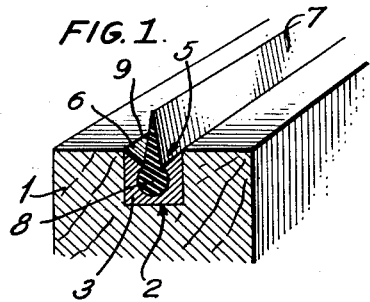
Fig. 1 is a perspective view, partly in section, of one form of the invention, showing the sealing strip and bearing member applied to a base.

In Figs. 1-4, the reference numeral 1 indicates a part of a base, for example, a window-frame or a door edge, having a longitudinal groove 2 of rectangular cross-section. Into this groove a bearing member 3, in the form of a profiled lath, is pressed or otherwise suitably fastened. The lath 3 (Fig. 5) has a longitudinal notch 4 of circular cross-section which, through a rather narrow or constricted passage 5, opens upwardly into a recessed portion formed at the top of the lath by the sloping surfaces 6. The elastic strip 7 (Fig. 1) has a fixing part 8 of round cross-section from which extends a sealing part 9 shown as being wedge-shaped in cross-section, although it can be of any other suitable shape. The fixing part 8 is closely received in the notch 4, and the sealing part 9 passes through the notch passage 5 and the recess 6 and juts beyond the grooved surface of the base 1.

Figure 2:
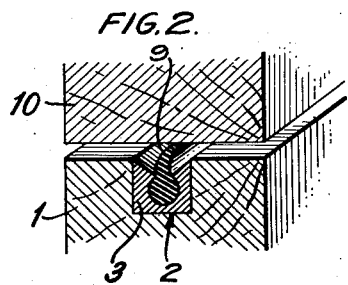
Fig. 2 is a view similar to Fig. 1 but showing the strip in sealing position against an abutment.

When the base 1 moves toward the abutment 10 (or the abutment moves toward the base), the sealing part 9 of the strip 7 is pressed against the abutment to effect the sealing, as shown in Fig. 2. The motion between the base 1 and the abutment 10 may be perpendicular or parallel to their opposing surfaces, or partly perpendicular and partly parallel.

Figures 3, 6:
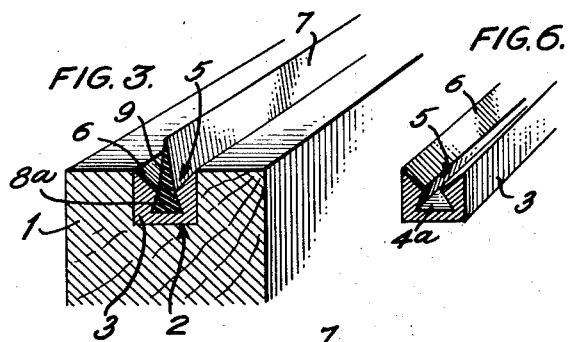
Figs. 3 and 4 are views similar to Fig. 1 but showing different forms of the strip and bearing member.
Figs. 5, 6 and 7 are detail perspective views of the bearing members shown in Figs. 1-2, Fig. 3 and Fig. 4, respectively.

The device shown in Figs. 3 and 6 differs from that described above in that the shape of the notch 4a in the bearing member 3, and the fixing part 8a of the strip 7, is triangular, with the notch in the bearing member expanding in the direction from the passage 5.

Figures 4, 7:
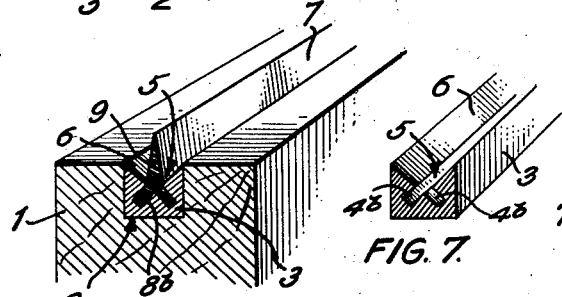
Figure 5:
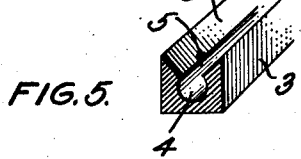

In Figs. 4 and 7, the fixing part 8b of the strip 7 and the notch 4b in the bearer 3 are V-shaped.

The details of the devices shown in Figs. 1-7 can be varied. For example, the sealing part 9 of the strip 7 can be round in cross-section and either solid or tubular, or it can be V-shaped or of some other configuration. The bearing member 3 can be of any suitable shape in cross-section, such as dove-tailed, V-shaped, etc.

The lath 3 does not have to extend to the top of the groove 2, but may terminate somewhat below the grooved surface of member 1. In that case it is not necessary that the lath 3 be provided with a recess 6, as this serves mainly as a hollow for the sealing part of the strip when deformed by sealing.

Figure 8:
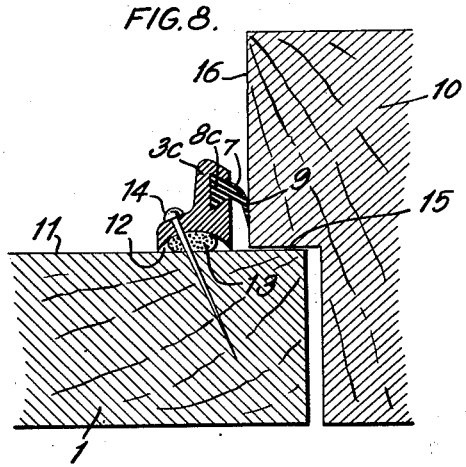
Fig. 8 is a sectional view of another embodiment of the device, in which the bearing member is nailed to the surface of the base.

As shown in Fig. 8, the lath 3c is placed on the surface 11 of the base 1. The lath has a notch for the fixing part 8c of a strip 7. The passage leading to the notch coincides with the vertical surface of the lath, as shown in the drawing. The space between the lath 3c and the surface 16 of the abutment 10 has the same function as the recess 6 in the embodiment shown in Figs. 1-7. The part of the lath resting against the surface 11 is hollow or recessed, as shown at 12, to allow a packing 13 between the lath 3c and the base 1. The lath can be fastened to the base by nails 14. If the lath is of a soft metal, plastic, or the like, and the nails are sufficiently hard and stiff, for instance of steel, the nails can be driven through the lath without drilling beforehand. In Fig. 8, the abutment 10 is shown with a shoulder 15, against which the base 1 can rest.

Figure 9:
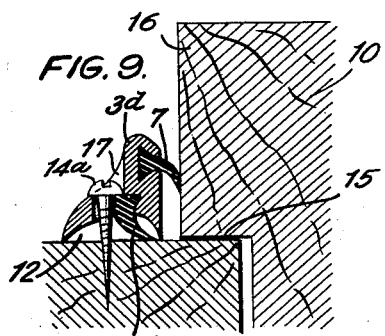
Figs. 9 and 10 are sectional views of modified forms of the device shown in Fig. 8.

The embodiment in Fig. 9 differs from that in Fig. 8 mainly by the use of a second strip 7¹, similar to the strip 7, inserted into a second notch in the lath, the strip 7¹ taking the place of the packing 13 for sealing against the base 1. In Fig. 9, the lath 3d is shown fastened to the base by screws 14a, the heads of which are countersunk in the lath.

Figure 10:
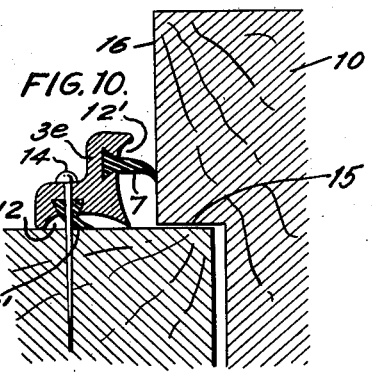

The embodiment shown in Fig. 10 differs from that of Fig. 9 principally in that the lath 3c is of symmetrical section. The recess 12¹ is similar to the recess 12, the sealing strip 7 passing through the recess 12¹, and the packing strip 7¹ passing through the recess 12. The packing strip 7¹ can be nailed in place, as shown at 14 in Fig. 10.

It would, of course, be possible to use laths made of rolled metal strips, instead of drawn or extruded ones. However, it is not presently possible to obtain the same precision by rolling or bending as by drawing, extrusion, or the like. In the following claims, the words "extruded lath" are intended to denote any lath made by forcing the material, in more or less plastic condition, through a die, or the like, as in an extruding or drawing operation.

I claim:

1. In combination with two relatively movable bodies constituting a base and an abutment, a device for sealing a space between said bodies, which comprises an elastic sealing strip having a fixing part and a sealing part, the sealing part having a cross-section which tapers from said fixing part and being adapted for sealing engagement with the abutment, and a separate bearing member secured to the base and having a notch in which said fixing part of the strip is held, said sealing strip and notch being symmetrical in cross-section and the notch having sides closely engaging said fixing part and also having oppositely slanting sides converging toward said fixing part and said first sides to define a central slit at the junction of said fixing and sealing parts.

2. The combination according to claim 1, wherein the bearing member is an extruded lath in which the cross-section of said notch matches the cross-section of said fixing part of the strip.

3. The combination according to claim 1, wherein the bearing member is an extruded lath in which the cross-section of said notch matches the cross-section of said fixing part of the strip, the notch cross-section expanding in a direction away from said sealing part, thereby locking the strip in the notch against forces perpendicular to the strip.

4. The combination according to claim 1, wherein the bearing member is an extruded lath in which the cross-section of said notch matches the cross-section of said fixing part of the strip, the bearing member being polygonal in cross-section.

5. The combination according to claim 1, in which said base is grooved, the bearing member being fitted in the base groove.

6. The combination, according to claim 1, in which said base is grooved, the bearing member being fitted in the base groove and forming therein a recess for said sealing part of the strip.

7. In combination with two relatively movable bodies constituting a base and an abutment, a device for sealing a space between said bodies, which comprises an elastic sealing strip having a fixing part and a sealing part, the sealing part being adapted for sealing engagement with the abutment, and a separate bearing member secured to the base and having a notch in which said fixing part of the strip is held, the bearing member having two surfaces substantially perpendicular to each other, said notch being disposed in one of the surfaces and the other surface being fixed to the base, said last surface having a recess and a packing member located in said last recess between the bearing member and the base.

8. The combination according to claim 7, in which said packing member is a second elastic strip held in a second notch in said bearing member and in sealing engagement with the base.

9. The combination according to claim 7, in which the bearing member is symmetrical in cross section.

10. In combination with two relatively movable bodies constituting a base and an abutment, a device for sealing a space between said bodies, which comprises an elastic sealing strip having a fixing part and a sealing part, the sealing part having a cross-section which tapers from said fixing part and being adapted for sealing engagement with the abutment, and a separate bearing member secured to the base and having a notch in which said fixing part of the strip is held, said sealing strip and notch being symmetrical in cross-section and the notch having sides closely engaging said fixing part and also having oppositely slanting sides converging toward said fixing part and said first sides to define a central slit at the junction of said fixing and sealing parts, the bearing member having two surfaces substantially perpendicular to each other, said notch being disposed in one of the surfaces and the other surface being fixed to the base, said last surface having a recess, and a packing member located in said last recess between the bearing member and the base.

11. In combination with two relatively movable bodies constituting a base and an abutment, a device for sealing a space between said bodies, which comprises an elastic sealing strip having a fixing part and a sealing part, the sealing part having a cross-section which tapers from said fixing part and being adapted for sealing engagement with the abutment, and a separate bearing member secured to the base and having a notch in which said fixing part of the strip is held, said sealing strip and notch being symmetrical in cross-section and the notch having sides closely engaging said fixing part and also having oppositely slanting sides converging toward said fixing part and said first sides to define a central slit at the junction of said fixing and sealing parts, the bearing member having two surfaces substantially perpendicular to each other, said notch being disposed in one of the surfaces and the other surface being fixed to the base, said last surface having a second notch, and a second elastic strip held in said second notch and in sealing engagement with the base.

12. In combination with two relatively movable bodies constituting a base and an abutment, a device for sealing a space between said bodies, which comprises an elastic sealing strip having a fixing part and a sealing part, the sealing part having a cross-section which tapers from said fixing part and being adapted for sealing engagement with the abutment, and a separate bearing member secured to the base and having a notch in which said fixing part of the strip is held, said sealing strip and notch being symmetrical in cross-section and the notch having sides closely engaging said fixing part and also having oppositely slanting sides converging toward said fixing part and said first sides to define a central slit at the junction of said fixing and sealing parts, the bearing member having two surfaces substantially perpendicular to each other, said notch being disposed in one of the surfaces and the other surface being fixed to the base, said last surface having a second notch, and a second elastic strip held in said second notch and in sealing engagement with the base, the bearing member being symmetrical in cross-section.

References Cited in the file of this patent

UNITED STATES PATENTS

| | | |
|---|---|---|
| 818,764 | Hull | Apr. 24, 1906 |
| 1,337,394 | Dillingham | Apr. 20, 1920 |
| 1,383,191 | Dillingham | June 28, 1921 |
| 1,735,048 | Lasker | Nov. 12, 1929 |
| 1,965,014 | Trautvetter | July 3, 1934 |
| 2,040,133 | Harnly | May 12, 1936 |